May 26, 1953 W. A. WHITING 2,639,731
REINFORCED CONCRETE PIPE
Filed July 11, 1949 2 Sheets-Sheet 1

INVENTOR.
WILLIAM A. WHITING
BY
Mellin + Hanscom
ATTORNEYS

May 26, 1953 W. A. WHITING 2,639,731
REINFORCED CONCRETE PIPE
Filed July 11, 1949 2 Sheets-Sheet 2

INVENTOR.
WILLIAM A. WHITING
BY
Mellin + Hanson
ATTORNEYS

Patented May 26, 1953

2,639,731

UNITED STATES PATENT OFFICE 2,639,731

REINFORCED CONCRETE PIPE

William A. Whiting, Long Beach, Calif., assignor to American Pipe and Construction Co., Los Angeles, Calif., a corporation of Delaware Application July 11, 1949, Serial No. 103,971

1 Claim. (Cl. 138—84)

This application is a continuation-in-part of my co-pending application, Serial No. 707,668, entitled "Reinforced Concrete Pipe and Method of Making the Same," filed November 4, 1946, which has issued into Patent No. 2,602,469 dated July 8, 1952.

It is an object of the present invention to provide a reinforced concrete pipe joint of the general character described and claimed in my above-identified co-pending application.

It is a particular object of the present invention to provide a concrete pipe joint adapted to carry water under high pressure as, for example, in water mains of large cities and the water supply system therefor, such joint being characterized by great strength, leak-proofness, and balanced stresses and strains.

These and other objects of the invention will be apparent from the ensuing description and the appended claims.

The invention is exemplified in the following description and illustrated by way of example in the accompanying drawings, in which.

Figure 1:
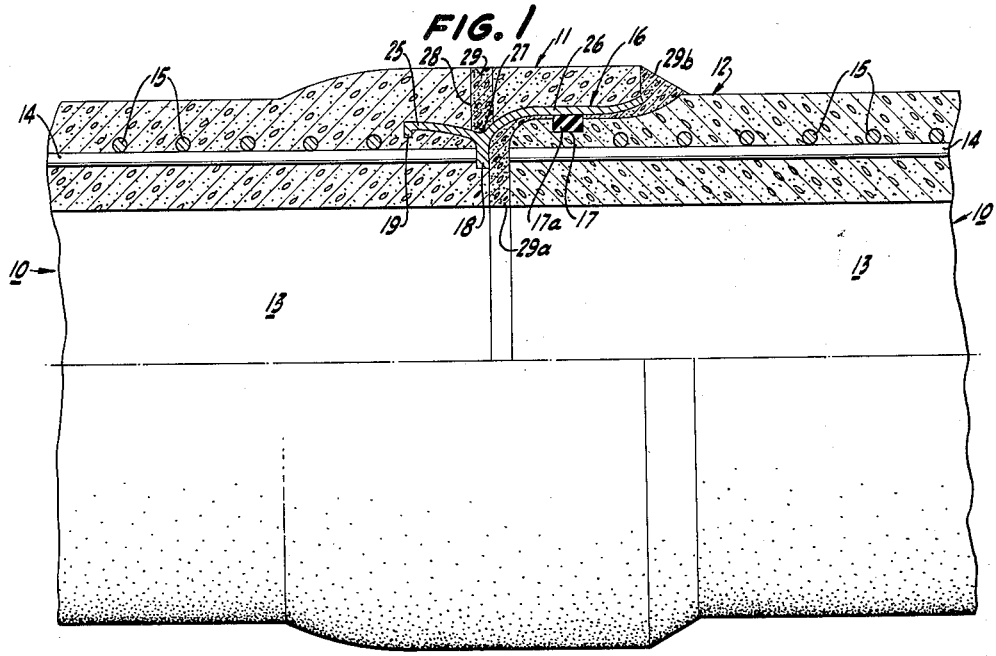
Fig. 1 is a view partly in longitudinal section and partly in side elevation of the bell and spigot ends of two adjoining pipe sections, illustrating one form of pipe joint of the invention.

Referring to the drawings and more particularly to Fig. 1, two identical pipe sections 10 are illustrated, the bell portion 11 of one section and the spigot portion 12 of the other section being shown. The body portion 13 of each pipe section 10 is formed of concrete and it is reinforced by longitudinal reinforcement rods 14 and by circumferential reinforcement rods 15, which may be of any suitable flexible construction such, for example, as cable steel. As illustrated, the longitudinal reinforcement rods 14 are fixed at one end to a bell band 16. The spigot end of the pipe section is formed with an annular recess 17 for receiving a sealing gasket 17a as illustrated.

The bell band 16 is formed with a forward annular flange 18 and a rearward annular flange 19, and it is also formed with a pipe end or portion 25 and a bell end or portion 26. The pipe end 25 diverges rearwardly and the bell end 26 diverges forwardly, as illustrated, thus providing a recess or depression 27 therebetween which is disposed in the same plane as the forward flange 18. A suitable number of radial openings or passages 28 (of which only one is shown) are left in the concrete body 13 and the annular recess 27 defined by the bell band is filled with a cement grout for the purpose of draining off water which accumulates in the recess 27 after the pipe section has been fabricated and has thoroughly set. The openings 27 may be filled with any suitable plugs 29 such, for example, as neat cement.

A suitable method of fabricating the pipe sections 10 is that set forth in my above-identified co-pending application. Obviously, however, other methods of manufacture may be employed.

The sections 10 are brought into end-to-end relationship with the spigot end of one section inserted in the bell end of an adjoining section, as illustrated, and a water tight joint is provided by means of mortar 29a and cement grout 29b.

Figure 2:
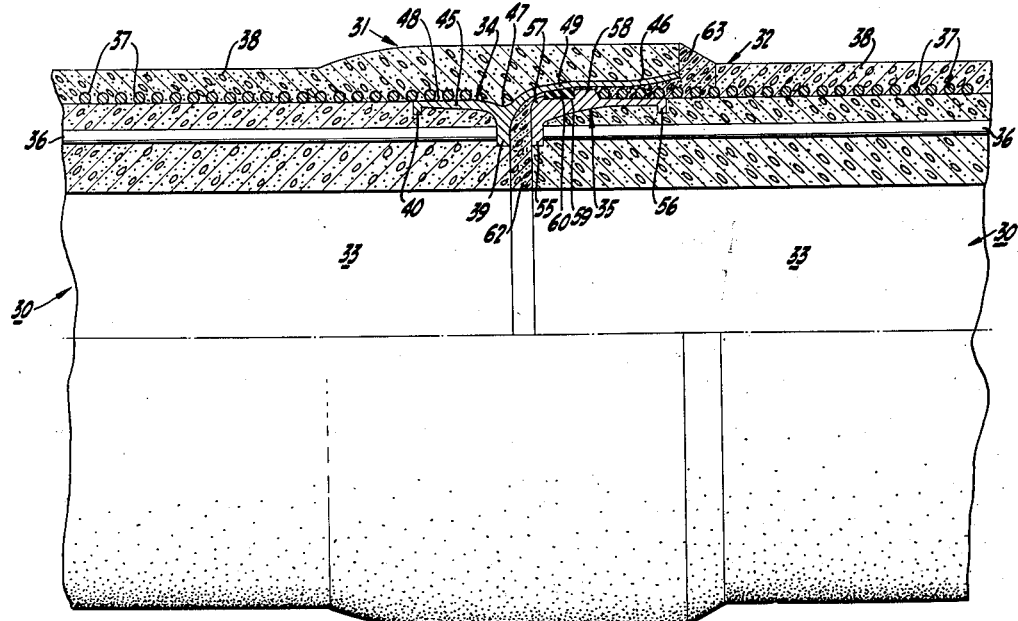
Fig. 2 is a similar view of another embodiment of the invention.

Referring now to Fig. 2, pipe sections 30 are illustrated, each having a bell end 31 and a spigot end 32. The main body portion 33 of each pipe section is pre-cast of concrete, preferably by a centrifugal casting method such as described in my co-pending application. A bell band 34 is provided for the bell end 31 and a spigot band 35 is provided for the spigot end 32. Longitudinal reinforcement rods 36 are provided, as in the pipe sections 10 of Fig. 1, these rods being tied at their ends to the bell band 34 and the spigot band 35.

The pre-cast body portion 33, after it has set sufficiently to withstand compression, is wrapped with steel rods 37 to provide circumferential reinforcement and thereafter a mortar coating 38 is cast about the pre-cast wrapped section 30. Both the longitudinal rods 36 and the circumferential rods 37 are tensioned.

The bell band 34 is provided with a forward annular flange 39 and with a rearward annular flange 40, and with a pipe end 45 and a bell end 46, which define an annular recess 47. The pipe end 45 of the bell band is formed with a flat cylindrical surface 48. The bell end of the bell band diverges generally forwardly, as illustrated, to provide a frusto-conical surface 49.

The spigot band 35 is formed with a forward annular flange 55 and with a rearward annular flange 56, and it is also formed with a forward annular shoulder 57 and a rearward annular shoulder 58 defining an annular recess 59 for receiving a sealing gasket 60, which seals against the frusto-conical surface 49 formed on the bell band. As illustrated, adjoining pipe sections 30 are brought into end-to-end axial alignment, and mortar 62 and cement grout 63 provide a cementing and sealing medium for cementing and sealing the ends.

Figure 3:
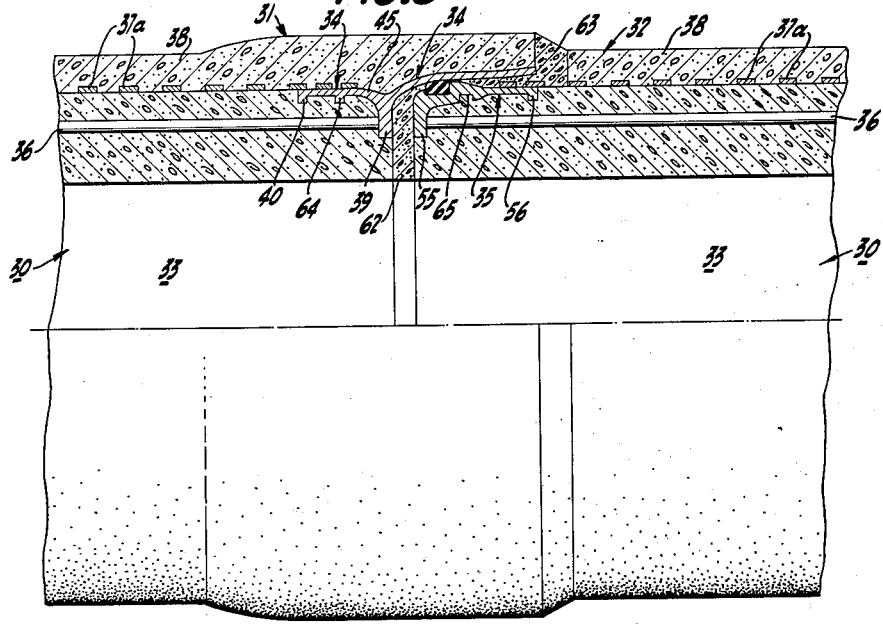
Fig. 3 is a similar view of still another embodiment of the invention.

Referring now to Fig. 3 a structure generally similar to that of Fig. 2 is illustrated in which similar parts are similarly numbered. The structure of Fig. 3 is better adapted to high pressure usage. The pipe end 45 of the bell band 34 is provided with an annular flange 64 intermediate the forward flange 39 and rearward flange 40 and the spigot band 35 is provided with an annular recess 65 intermediate the forward flange 55 and rearward flange 56. As is also illustrated, the circumferential reinforcement members 37a are flat rods. The body portion 33 of each pipe section is pre-cast and, after it has set sufficiently, the circumferential reinforcement members 37a, a mortar coating 38 and a mortar and cement grout joint 62, 63 are provided as described above with reference to Fig. 2.

The flat circumferential reinforcement rods 37a are advantageous in that they have a plane contact rather than a line contact with the pre-cast portion of the pipe. Thus, they do not bite into the pre-cast portion to the same degree as round rods having a line contact and are therefore less likely to lose their pre-tension.

Figure 4:
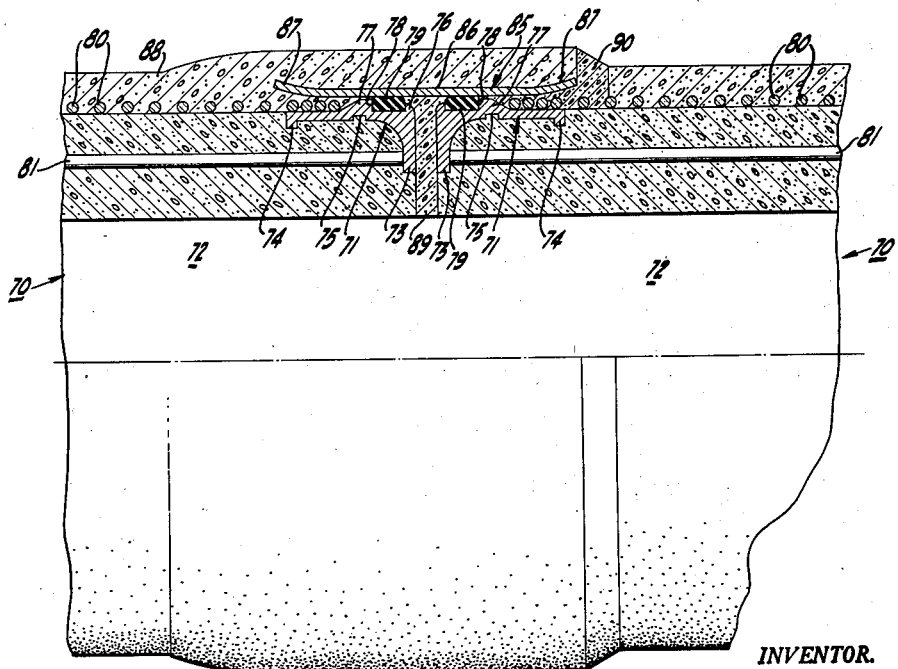
Fig. 4 is a similar view of a fourth embodiment of the invention.

Referring now to Fig. 4, there is illustrated still another embodiment of the invention. In this embodiment, each pipe section 70 is of cylindrical section from end to end, that is to say, it is not formed with a flaring bell portion at one end. Instead, identical spigot bands 71 are provided at each end of the pre-cast concrete body 72, and each spigot band 71 is formed with a forward flange 73, a rearward flange 74 and an annular recess 75 intermediate the flanges 73 and 74. Each spigot band 71 is also formed on its outer surface with an annular forward shoulder 76 and an annular, rearward shoulder 77 defining an annular recess 78 for reception of a gasket 79. Circumferential reinforcement members 80 are provided, as illustrated. As is also illustrated, longitudinal reinforcement rods 81 are provided, being tied at their ends of the flanges 73 of the spigot bands 71.

After the pre-cast body portion 72 has set sufficiently, it is wrapped with the reinforcement members 80 and an annular bell band 85 is placed over one of the spigot bands i. e., over the left hand spigot band as viewed in Fig. 4. As illustrated, the bell band 85 is formed with a central, cylindrical section 86 and with upwardly, rearwardly slanting end portions 87. A mortar coating 88 is then cast about the pipe section 70 and bell band 85 and is allowed to set, after which the sections brought into end-to-end, axial alignment and a suitable mortar 89 and cement grout 90 are provided at the joint, as illustrated.

Among particular advantages of the concrete pipe joints thus described and illustrated, may be mentioned the following: The outer flanges in the bell bands (i. e., the flanges 18, 39 and 73), being tied to the longitudinal reinforcement rods, serve to direct plastic flow of the concrete up behind the flanges. The various inner flanges (19, 40, etc.) and the intermediate flange 64 of Fig. 3, likewise the annular recesses 65 and 75 of Figs. 3 and 4, serve to confine and/or direct the plastic flow of concrete. Thus a confining action and a balancing of stresses and pressures is achieved. In Fig. 3, the pipe end of the bell band, and the spigot band are of comparatively thin section, thus facilitating the transmission of radial compression to the ends of the structure. Accordingly, compression is equalized along the entire length of the pipe, causing it to act as a unitary pre-stressed concrete structure.

The structure of Fig. 1 is adapted to carry water at low and intermediate pressures while the structures of Figs. 2, 3 and 4 are adapted to carry water at intermediate and high pressures.

It is thus apparent that several forms of concrete pipe joint are provided which ensure high strength, resistance to strains and stresses encountered owing to high water pressures and incident to laying and covering of the pipe sections. It is further apparent that several embodiments of the invention are provided, each having special advantages such, as simplicity of design and manufacture or maximum strength and the ability to carry water at high pressure.

While I have shown the preferred form of my invention, it is to be understood that various changes may be made therein by those skilled in the art without departing from the spirit of the invention as defined in the appended claim.

Having thus described my invention what I claim and desire to secure by Letters Patent is:

A pipe structure comprising a pre-cast tubular cementitious body having a bell end and a spigot end, longitudinal reinforcement rods under tension embedded in the body, a bell band having a radially and inwardly extending flange, a longitudinally and circumferentially extending flange and an outwardly extending bell portion lining the bell, said reinforcement rods being secured to the radially and inwardly extending flange of the bell band, said longitudinally and circumferentially extending flange being of a thin compressible structure and having a radially and inwardly extending flange at its terminal, a spigot band having a forward shoulder, a rearward shoulder and a recess formed intermediate said shoulders, said recess adapted to receive a sealing gasket, a radially and inwardly extending flange formed at the forward shoulder of said spigot band and secured to the longitudinal reinforcement rods, a longitudinally and circumferentially extending flange formed at the rearward shoulder of said spigot band, said flange being of a thin compressible structure and having a radially and inwardly extending flange formed at its terminal, circumferential reinforcement cables under tension spaced axially along said body to include each longitudinal and cricumferential flange of the bell and spigot band, thereby compressing said flanges into the body so as to form a liquid tight seal therewith, and a circumferential coating of cementitious material embedding said circumferential cables and coating the body.

WILLIAM A. WHITING.

References Cited in the file of this patent

UNITED STATES PATENTS

| Number | Name | Date |
|---|---|---|
| 1,529,495 | Mitchell | Mar. 10, 1925 |
| 2,234,643 | Grant | Mar. 11, 1941 |
| 2,265,328 | Trickey | Dec. 9, 1941 |
| 2,325,469 | Boissou | July 27, 1943 |
| 2,416,618 | Ferla | Feb. 25, 1947 |